US 012602263B2

(12) United States Patent
Gkoufas et al.

(10) Patent No.: US 12,602,263 B2
(45) Date of Patent: Apr. 14, 2026

(54) TRANSPARENT DATA TRANSFORMATION AND ACCESS FOR WORKLOADS IN CLOUD ENVIRONMENTS

(71) Applicant: INTERNATIONAL BUSINESS MACHINES CORPORATION, Armonk, NY (US)

(72) Inventors: Ioannis Gkoufas, East Road (IE); Christian Pinto, Dublin (IE); Srikumar Venugopal, Dublin (IE); Stefano Braghin, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 17/138,858

(22) Filed: Dec. 30, 2020

(65) Prior Publication Data

US 2022/0206872 A1   Jun. 30, 2022

(51) Int. Cl.
| | |
|---|---|
| *G06F 9/50* | (2006.01) |
| *G06F 16/25* | (2019.01) |
| *G06F 21/62* | (2013.01) |
| *G06N 20/00* | (2019.01) |

(52) U.S. Cl.
CPC .......... *G06F 9/5083* (2013.01); *G06F 9/5027* (2013.01); *G06F 9/5072* (2013.01); *G06F 16/258* (2019.01); *G06F 21/6254* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,812,524 B2 | 8/2014 | Chen et al. | |
| 9,349,026 B2 | 5/2016 | Gianniotis et al. | |
| 9,405,787 B2 | 8/2016 | Takenouchi | |
| 9,460,311 B2 | 10/2016 | Bezzi et al. | |
| 9,519,696 B1 | 12/2016 | Roth et al. | |
| 9,760,718 B2 | 9/2017 | Braghin et al. | |
| 10,095,763 B1 * | 10/2018 | Colgrove | G06F 16/26 |
| 10,095,883 B2 | 10/2018 | Antonatos et al. | |
| 10,671,435 B1 * | 6/2020 | Gold | G06N 20/00 |

(Continued)

FOREIGN PATENT DOCUMENTS

| | | |
|---|---|---|
| CN | 107301048 A | 10/2017 |
| IN | 110990374 A | 4/2020 |

OTHER PUBLICATIONS

Mell, P. et al., "Recommendations of the National Institute of Standards and Technology"; NIST Special Publication 800-145 (2011); 7 pgs.

(Continued)

*Primary Examiner* — Dawaune A Conyers
(74) *Attorney, Agent, or Firm* — CHIP LAW GROUP

(57) ABSTRACT
A computer-implemented method of providing data transformation includes installing one or more data transformation plugins in a dataset made accessible for processing an end user's workload. A dataset-specific policy for the accessible dataset is ingested. A data transformation of the accessible dataset is executed by invoking one or more of the data transformation plugins to the accessible dataset based on the dataset-specific policy to generate a transformed dataset. The user's workload is deployed to provide data access for processing using the transformed dataset in accordance with a data governance policy.

19 Claims, 7 Drawing Sheets

(56) References Cited

U.S. PATENT DOCUMENTS

| | | | | |
|---|---|---|---|---|
| 11,521,100 | B1 * | 12/2022 | Arora | G06N 5/022 |
| 2006/0248124 | A1 * | 11/2006 | Petev | G06F 12/0842 |
| | | | | 711/E12.039 |
| 2015/0007249 | A1 * | 1/2015 | Bezzi | G06F 21/6227 |
| | | | | 726/1 |
| 2017/0070536 | A1 * | 3/2017 | Mortman | H04L 41/00 |
| 2019/0087604 | A1 | 3/2019 | Antonatos et al. | |
| 2019/0294613 | A1 * | 9/2019 | Sullivan | G06F 16/254 |
| 2019/0370263 | A1 * | 12/2019 | Nucci | G06F 16/254 |
| 2020/0026710 | A1 * | 1/2020 | Przada | G06F 16/254 |
| 2020/0320406 | A1 | 10/2020 | Antonatos et al. | |
| 2022/0366078 | A1 * | 11/2022 | Kirti | G06N 5/022 |

OTHER PUBLICATIONS

Felici, M. et al., "Accountability for Data Governance in Cloud Ecosystems"; IEEE International Conference on Cloud Computing Technology and Science (2013); pp. 327-332.

Dong, X. et al., "Achieving an Effective, Scalable and Privacy-Preserving Data Sharing Service in Cloud Computing"; Computer & Security (2014); vol. 42; pp. 151-164.

Gross, S. et al., Towards User Centric Data Governance and Control in the Cloud; IFIP International Federation for Information Processing (2012); pp. 132-144.

Khaitzin, E. et al., "Deep Enforcement: Policy-based Data Transformations for Data in the Cloud"; 11th USENIX Workshop on Hot Topics in Cloud Computing HotCloud (2019); 6 pgs.

Yang, J. et al., "A Hybrid Solution for Privacy Preserving Medical Data Sharing in the Cloud Environment"; Future Generation Computer Systems (2015); vol. 43:C; 7 pgs.

"The Most Widely Deployed Open Source Cloud Software in the World", OpenStack, <https://www.openstack.org/>, retrieved from internet on Oct. 30, 2020, 06 pages.

Kubernetes (K8s), "Production-Grade Container Orchestration", Kubernetes, <https://kubernetes.io/>, retrieved from internet on Oct. 30, 2020, 10 pages.

* cited by examiner

Figure 3:
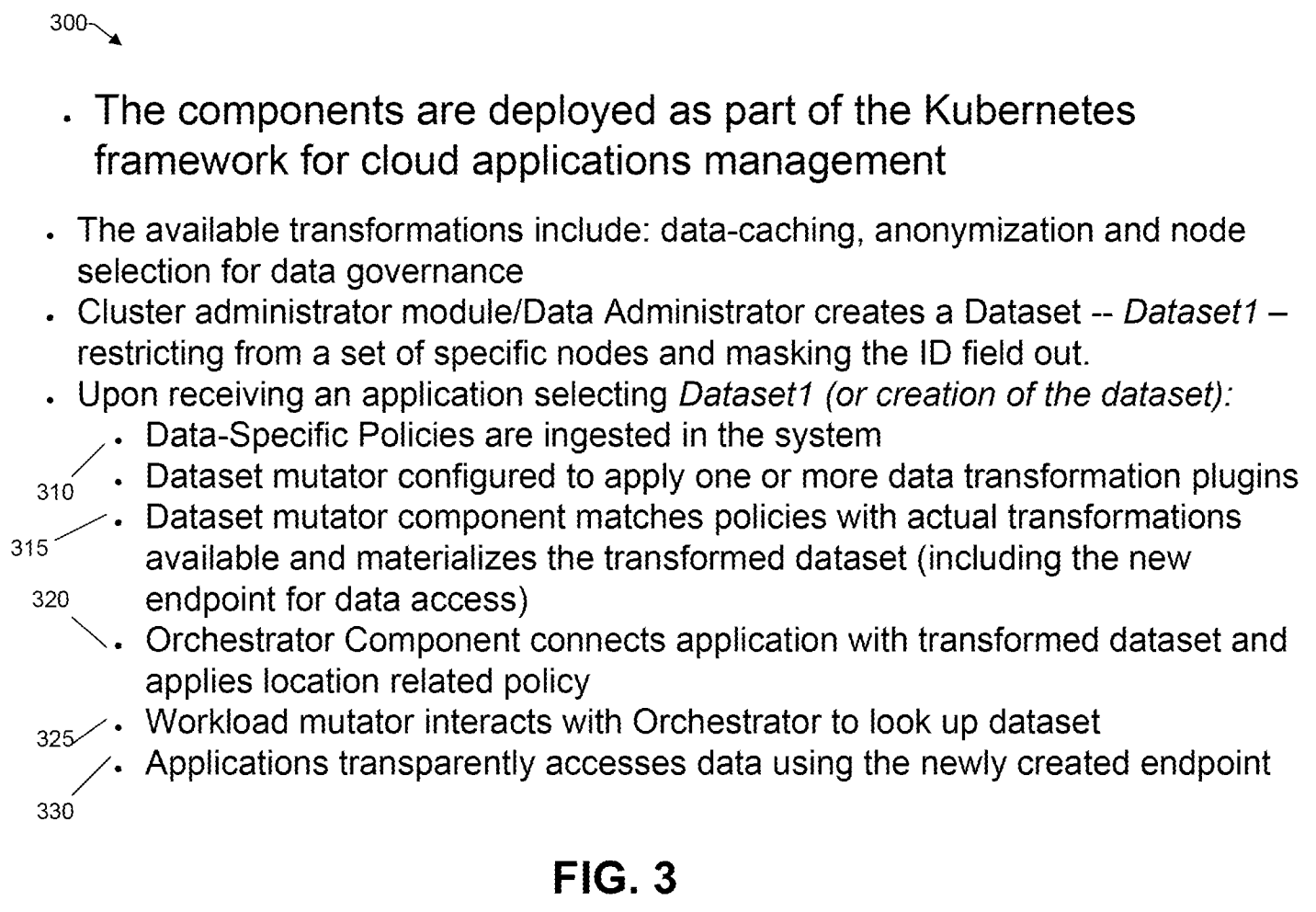

- The components are deployed as part of the Kubernetes framework for cloud applications management

- The available transformations include: data-caching, anonymization and node selection for data governance

- Cluster administrator module/Data Administrator creates a Dataset -- *Dataset1* -- restricting from a set of specific nodes and masking the ID field out.

- Upon receiving an application selecting *Dataset1 (or creation of the dataset)*:
  - Data-Specific Policies are ingested in the system
  - Dataset mutator configured to apply one or more data transformation plugins
  - Dataset mutator component matches policies with actual transformations available and materializes the transformed dataset (including the new endpoint for data access)
  - Orchestrator Component connects application with transformed dataset and applies location related policy
  - Workload mutator interacts with Orchestrator to look up dataset
  - Applications transparently accesses data using the newly created endpoint

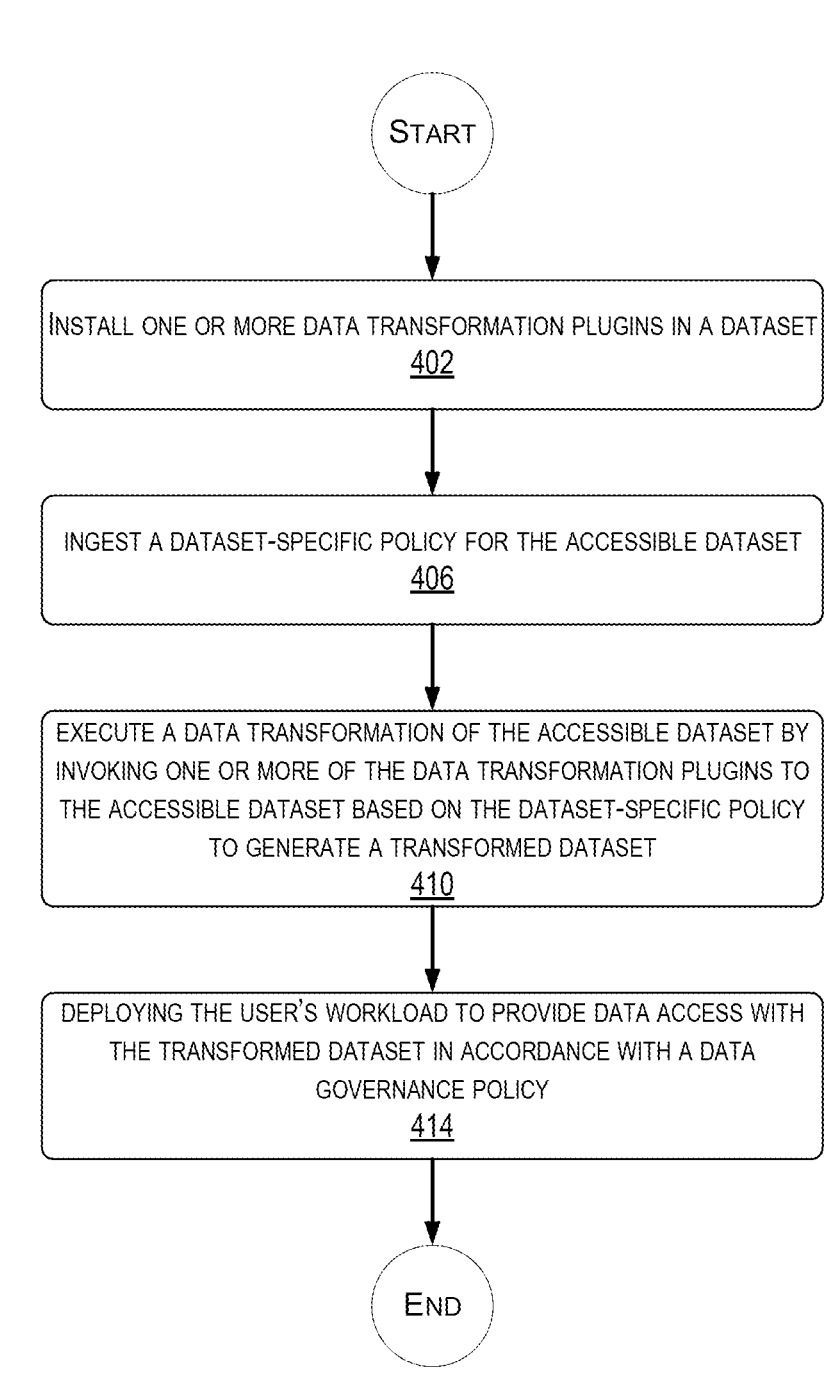

400

START

INSTALL ONE OR MORE DATA TRANSFORMATION PLUGINS IN A DATASET
402

INGEST A DATASET-SPECIFIC POLICY FOR THE ACCESSIBLE DATASET
406

EXECUTE A DATA TRANSFORMATION OF THE ACCESSIBLE DATASET BY INVOKING ONE OR MORE OF THE DATA TRANSFORMATION PLUGINS TO THE ACCESSIBLE DATASET BASED ON THE DATASET-SPECIFIC POLICY TO GENERATE A TRANSFORMED DATASET
410

DEPLOYING THE USER'S WORKLOAD TO PROVIDE DATA ACCESS WITH THE TRANSFORMED DATASET IN ACCORDANCE WITH A DATA GOVERNANCE POLICY
414

END

FIG. 4

DATA TRANSFORMATION MODULE
540

POLICY INGESTION
542

DATASET MUTATOR
544

WORKLOAD MUTATOR
546

ORCHESTRATOR
548

DATA GOVERNANCE
550

CPU
504

HDD
506

RAM/ROM
508

502

KEYBOARD
510

MOUSE
512

DISPLAY
514

COMM.
INTERFACE
516

654N

650

610

654B

654C

654A

600

TRANSPARENT DATA TRANSFORMATION AND ACCESS FOR WORKLOADS IN CLOUD ENVIRONMENTS

BACKGROUND

Technical Field

The present disclosure generally relates to data sources in cloud environments, and more particularly, to data transformation of an original data source.

Description of the Related Art

In cloud environments, High-Performance Computing and machine learning workloads pose challenges to granting/gaining data access. For example, in a Kubernetes environment, cluster administrators must configure access controls about local and remote data their end-users want to leverage.

SUMMARY

According to one embodiment, a computer-implemented method of providing data transformation includes installing one or more data transformation plugins in a dataset made accessible for processing an end user's workload. A dataset-specific policy for the accessible dataset is ingested. A data transformation of the accessible dataset is executed by invoking one or more of the data transformation plugins to the accessible dataset based on the dataset-specific policy to generate a transformed dataset. The user's workload is deployed to provide data access for processing using the transformed dataset in accordance with a data governance policy.

According to an embodiment, executing the data transformation of the accessible dataset and the deploying of the end user's workload to provide data access with the transformed dataset are cloud-based operations.

According to an embodiment, a new endpoint for data access is created in when the transformed dataset is generated.

According to an embodiment, the provided data access with the transformed dataset provides a data transparent access to the end-user.

According to an embodiment, the executing of data transformation by invoking the one or more of the data transformation plugins includes activating a data cache plugin installed in the accessible dataset.

According to an embodiment, the invoking of the one or more of the data transformation plugins includes activating an anonymization plugin installed in the accessible dataset.

According to an embodiment, at least one node is identified for the deploying of the end user's workload for processing.

According to an embodiment, the at least one node for the deploying of the end user's workload for processing is dictated according to the data governance policy.

According to an embodiment, materializing policies are applied in the transforming of the accessible dataset for applying data transformation according to the data governance policy.

According to an embodiment, the applying of materializing policies related to the data governance policy is based on a location of an end-user.

According to one embodiment, a data transformation system that provides access to a transformed dataset includes a policy ingestion component that is configured to ingest a data governance policy and determine a dataset-specific policy to be applied to a dataset. A dataset mutator is configured to apply one or more data transformation plugins to the dataset based on the data-specific policy to generate a transformed data source. An orchestrator is configured to apply to the dataset policies related to data governance and location. A workload definition mutator is configured to update user-defined workload definitions transparently and provide a workload with access to the transformed data source for processing.

According to an embodiment, the data mutator is configured to apply a data anonymization plugin to the dataset.

According to an embodiment, the data mutator is configured to apply a data caching plugin to the dataset.

According to an embodiment, the orchestrator is configured to determine one or more nodes permitted for processing of the dataset.

According to one embodiment, a computing device provides a data transformation. The computing device including a processor, and a memory coupled to the processor. The memory stores instructions to cause the processor to perform acts including installing one or more data transformation plugins in a dataset made accessible for an end user's workload. A dataset-specific policy for the accessible dataset is ingested, and a data transformation of the accessible dataset is executed by invoking one or more of the data transformation plugins to the accessible dataset based on the dataset-specific policy to generate a transformed dataset. The user's workload is deployed to provide data access using the transformed dataset in accordance with a data governance policy.

According to an embodiment, the instructions cause the processor to perform an additional act of activating a data cache plugin installed in the accessible dataset.

According to an embodiment, the instructions cause the processor to perform an additional act of activating an anonymization plugin installed in the accessible dataset.

According to an embodiment, the instructions cause the processor to perform an additional act of identifying at least one node for the deploying of the end user's workload for processing.

According to an embodiment, the identifying of the at least one node is dictated according to the data governance policy.

According to an embodiment, the instructions cause the processor to perform an additional act including updating user-defined workload definitions transparently for use with the transformed dataset.

According to an embodiment, the instructions cause the processor to perform an additional act of creating a new endpoint for data access in the generating of the transformed dataset.

According to one embodiment, a non-transitory computer-readable storage medium tangibly embodying a computer-readable program code having computer-readable instructions that, when executed, causes a computer device to perform a method of providing data transformation, the method includes installing one or more data transformation plugins in a dataset made accessible for an end-user's workload. A dataset-specific policy for the accessible dataset is ingested. A data transformation of the accessible dataset is executed by invoking one or more of the data transformation plugins to the accessible dataset. The data transformation includes one or more of data anonymization and data caching based on the dataset-specific policy to generate a transformed dataset, and the user's workload is deployed to provide data access using the transformed dataset in accordance with a data governance.

According to one embodiment, a computer-implemented method for performing data transformation in a Kubernetes framework for a cloud-based application includes receiving a dataset including a masked ID field and a restriction to a specific one or more nodes for processing. Polices for data transformation of the dataset are ingested. The ingested policies are matched with available data transformations for the dataset, and one or more of the available data transformations are applied to the dataset to generate a transformed dataset. An application is connected with the transformed dataset in accordance with a data governance.

According to an embodiment, a new endpoint is created for data access in the generating of the transformed dataset.

According to an embodiment, the computer-implemented method includes caching datasets transparent in the specific one or more nodes according to a data governance policy.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 3 describes components deployed as part of a Kubernetes framework, consistent with an illustrative embodiment.

FIG. 4 is a flowchart illustrating a computer-implemented method for data transformation, consistent with an illustrated embodiment.

DETAILED DESCRIPTION

Overview

Figure 1:
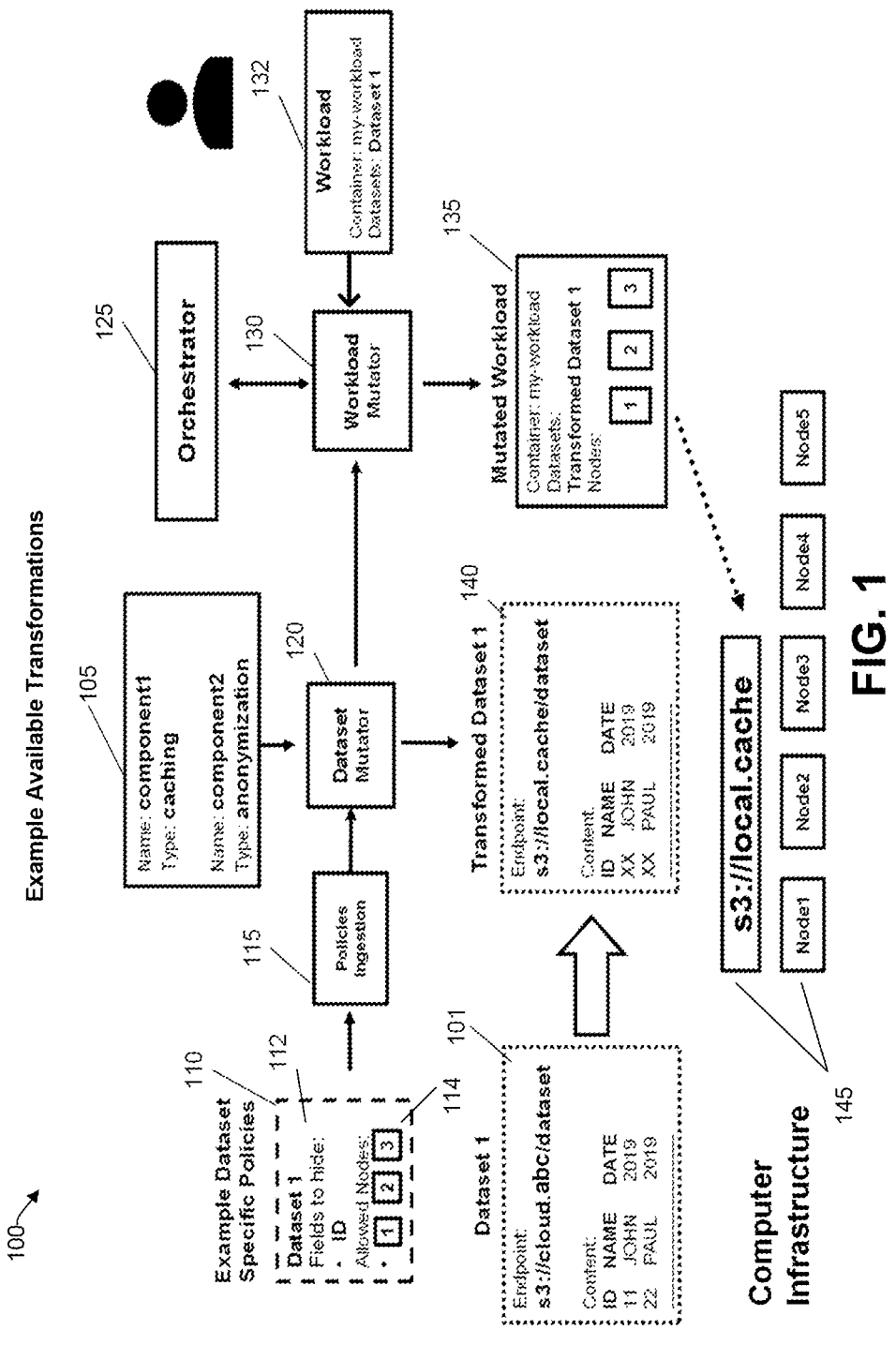
FIG. 1 provides an architectural overview of a system configured for data transformations, consistent with an illustrative embodiment.

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high-level, without detail, to avoid unnecessarily obscuring aspects of the present teachings.

In the present disclosure, the term "data transformation" refers to processes that take as an input an endpoint to a data source and expose a different endpoint which refers to the transformed original data source. Some examples of data transformation include but are not limited to data caching (e.g., to optimize a workload's performance) and data anonymization (e.g., hide sensitive columns from data). Typically, the user is not aware that certain data transformation has occurred on the data that they are viewing.

The term "data ingestion" as used herein refers to a process by which data is moved from one or more sources to a destination where it can be stored and further analyzed. In data ingestion, the obtaining and importing of data can be for immediate use or for storage in a database.

The term "orchestration" as used herein refers to the automation of multiple tasks to automatically execute a larger workflow or process. Such larger workflows and processes can include multiple tasks that are automated and include multiple systems.

The terms "data transparent" and "data transparent access" as used herein refer to the transformed dataset used to deploy the end user's workload. The end-user is unaware that a transformed dataset, rather than the actual dataset, has been made available by an administrator (or execution of an administrator module) and deployed in the end user's workload. The dataset is transformed by performing one or more of data anonymization and data caching based on a dataset-specific policy, and by performing a data governance prior to providing access to the end-user.

The computer-implemented method and device of the present disclosure provide for an improvement in the fields of data-transformation, data governance, and computer security. Current systems do not provide the desired functionality and have no consideration about data governance. The present disclosure also provides an improvement in computer operation with a novel application of data governance, and an improvement in the processing of data.

Additional advantages of the computer-implemented method and device of the present disclosure include the deployment to existing infrastructures with minimal changes to the workflow of end-users. In addition, the need to manually place data in nodes to satisfy data governance requirements is eliminated. End users do not have to configure access to the datasets they want to use in their workloads. The framework is highly extensible because interfaces are established that external components can implement and offer caching and anonymization capabilities.

Example Architecture

FIG. 1 provides an architectural overview of a system configured for data transformations, consistent with an illustrative embodiment. Referring to FIG. 1, a Dataset1 101 is made available for users of the computer infrastructure to use in their workloads. For example, an administrator module (or an administrator) provides a policy assigned to Dataset1 101. Such policies may have been previously-set by, for example, a data expert, and are now retrieved in response to the user's processing of workloads. Prior to making the Dataset1 101 available, the plugin module 105 installs transformation plugins for the Dataset1 101 that can provide anonymization and caching capabilities.

Dataset-specific policies 110 that are assigned to Dataset1 101 include hiding the ID field 112, which is anonymized (e.g., IDs represented by the "XX" in transformed dataset 140). There is also a governance policy assigned to Dataset1

110 that the only allowed nodes 114 to process Dataset1 110 are nodes 1, 2, and 3. It is to be understood that the hiding of the ID field 112 and the governance policy of allowed nodes 114 are provided for illustrative purposes. The present disclosure is not limited to dataset-specific policies 110 shown in FIG. 1.

The Policies Ingestion Component 115 receives the policies associated with Dataset1 101. The Dataset Mutator 120 is responsible for invoking one of the available plugins to anonymize and cache the Dataset1 101. The Dataset Mutator 120 creates the transformed Dataset1 140. The computer infrastructure 145 of the local cache and the nodes receive the mutated workload in accordance with the data governance.

In operation, a workload is submitted using Dataset1 101. The workload mutator 130 interacts with the Orchestrator 125 to lookup Dataset1 101 and receives the workload 132. Based on the interaction with the orchestrator 125, the workload mutator 130 deploys the workload 135 using the Transformed Dataset1. The workload is deployed in one of the nodes (e.g., 1, 2, 3) that are dictated by the governance policies related to the dataset.

Figure 2:
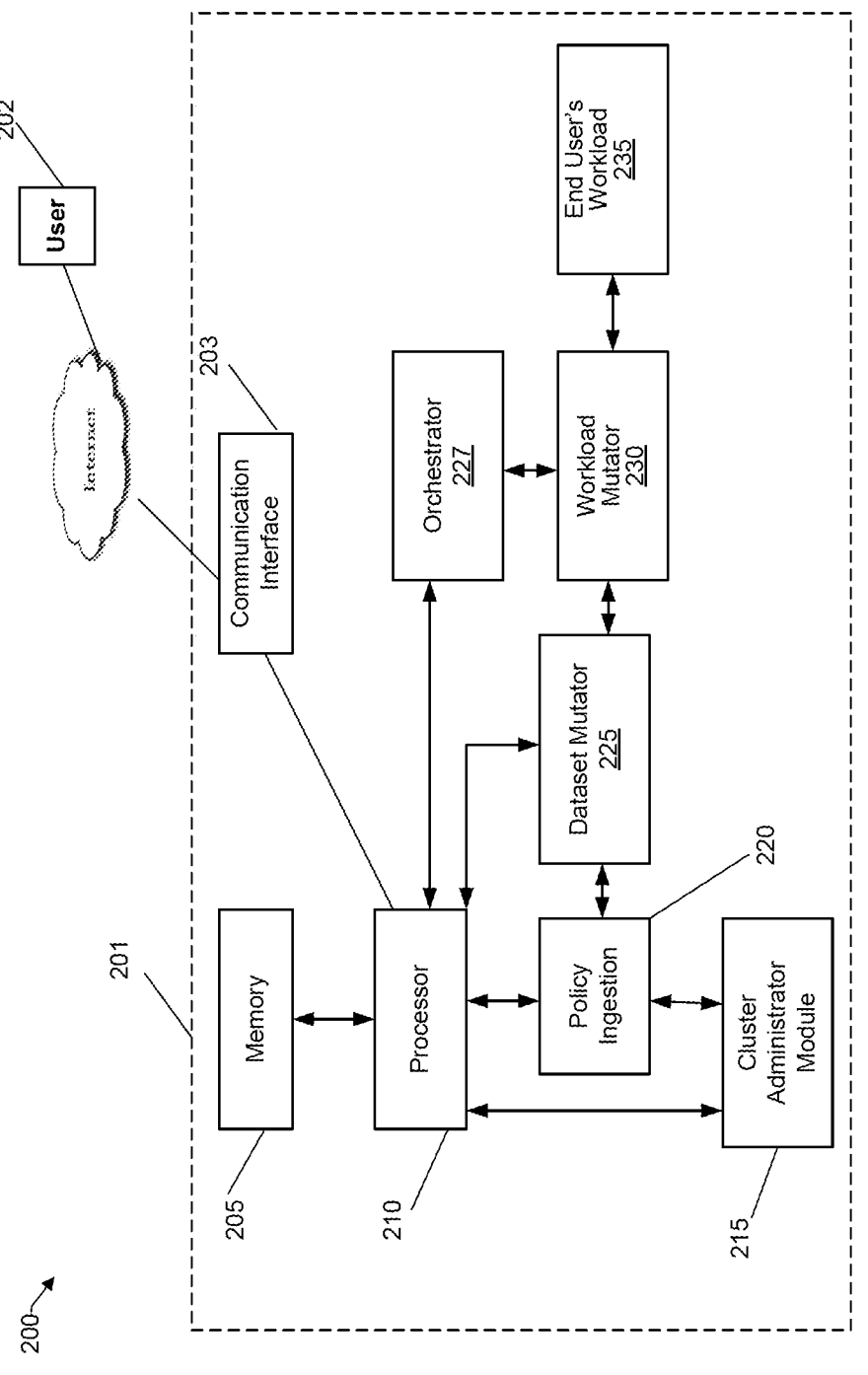
FIG. 2 illustrates a cloud-based computing device that performs data transformations, consistent with an illustrative embodiment.

FIG. 2 illustrates a cloud-based computing device 200 that performs data transformations, consistent with an illustrative embodiment. Although the device shown may be embodied as a cloud-based server 201, the present disclosure is not limited to the configuration shown and described.

A user 201 requests processing of a workload by the server 201. The communication interface to the Internet is, for example, wired (e.g., Ethernet), or a wireless (e.g., WiFi, cellular, etc.,) connection. The processor 210 is loaded with instructions stored in the memory to cause the processor to perform acts associated with data transformation according to the present disclosure.

The cluster administrator module 215 creates a Dataset that is restricted to one or more specific nodes, and the ID field of the dataset is masked. The cluster administrator module may have been loaded with the cluster administration data by an administrator prior to the workload processing request. A policy ingestion module 220 is configured to ingest policies associated with a dataset, and determine a dataset-specific policy to be applied to the dataset. The cluster administrator module 215 also provides the policy ingestion module 220 with data governance policy information.

The dataset mutator 225 is configured to apply one or more data transformation plugins to the dataset based on the data-specific policy to generate a transformed data source. The orchestrator 227 is configured to apply to the dataset policies related to data governance and location. The workload mutator 230 is configured to update user-defined workload definitions transparently and provide a user's workload 235 with access to the transformed data source for processing in one or more of the nodes in accordance with the data governance policy.

FIG. 3 describes operations of components deployed as part of a Kubernetes framework 300, consistent with an illustrative embodiment. The components are deployed as part of the Kubernetes framework for cloud applications management. For example, the available transformations include data-caching, data anonymization, and node selection for data governance. The description in FIG. 3 is applicable to the device shown in FIG. 2.

A cluster administrator module (such as shown in FIG. 2) creates a dataset with restricted node application (data governance) and masking out sensitive information, personal information, etc. The data specific policies 310 are ingested into the system At 315, a dataset mutator is configured to apply one or more data transformation plugins to a dataset. The dataset mutator also matches policies with actual transformations available and materializes a transformed data set. Included with the transformed dataset is a new endpoint for data access.

An Orchestrator Component is configured to connect an application with the transformed dataset and apply a location-related policy (320).

The workload mutator interacts with Orchestrator to look up the dataset (325), and the application transparently accesses data using the newly created endpoint (330). The user remains unaware (transparent access) that the transformed dataset is accessed for processing with the workload.

Example Process

With the foregoing overview of the example architecture, it may be helpful now to consider a high-level discussion of an example process. To that end, in conjunction with FIGS. 1-3, FIG. 4 depicts a flowchart 400 illustrating various aspects of a computer-implemented method, consistent with an illustrative embodiment. Process 400 is illustrated as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Referring now to FIG. 4, at operation 402, one or more data transformation plugins are installed in a dataset. The plugins may be for data-caching, data anonymization, and node selection, just to name a few non-limiting examples of plugins.

At operation 406, a dataset-specific policy for the accessible dataset is ingested. For example, a policy ingestion module may ingest the policy received from a cluster administrator module.

At operation 410, a data transformation of the accessible dataset is executed by invoking one or more of the data transformation plugins to the accessible dataset based on the dataset-specific policy. A transformed dataset is generated in which some of the data is masked (data anonymization), the data may be cached, and the permissible nodes specified for processing based on a data governance policy.

At operation 414, the user's workload is deployed to provide data access with the transformed dataset in accordance with a data governance policy. Processing of the user's workload with the transformed dataset can then be performed, as the method ends after operation 414. In the present disclosure, the data governance is applied automatically, whereas in known systems manual configuration of the data of the governance policies is required.

Example Particularly Configured Computer
Hardware Platform

Figure 5:
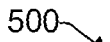
FIG. 5 is a functional block diagram illustration of a computer hardware platform for data transformations, consistent with an illustrative embodiment.

FIG. 5 provides a functional block diagram illustration 500 of a computer hardware platform. In particular, FIG. 5 illustrates a particularly configured network or host computer platform 500, as may be used to implement the methods shown in FIG. 4.

The computer platform 500 may include a central processing unit (CPU) 504, a hard disk drive (HDD) 506, random access memory (RAM) and/or read-only memory (ROM) 508, a keyboard 510, a mouse 512, a display 514, and a communication interface 516, which are connected to a system bus 502. The HDD 506 can include data stores.

In one embodiment, the HDD 506, has capabilities that include storing a program that can execute various processes, such as machine learning classification, sampling, meta-learning, selecting, and updating model parameters. The data transformation module 540, in a manner described herein above, is configured to manage the overall process.

The policy ingestion module 542 is configured to ingest policies associated with a dataset. The dataset mutator 544 is configured to invoke one of the plugins installed in the dataset to anonymize and cache the dataset, which results in the generation of the transformed dataset. Thus, end-users do not have to configure access to the datasets they want to use in their workloads.

The workload mutator 546 is configured to interact with the orchestrator 548 to deploy a workload submitted with the dataset. The orchestrator 548 is configured to apply to the dataset policies related to data governance and location. The data governance module 550 is configured to automatically provide the data governance policy for data placement (e.g., node selection) and eliminate the need to manually place data in nodes to satisfy governance requirements.

Example Cloud Platform

As discussed above, functions relating to the low bandwidth transmission of high definition video data may include a cloud. It is to be understood that although this disclosure includes a detailed description of cloud computing as discussed herein below, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.
Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.
Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).
Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 6:
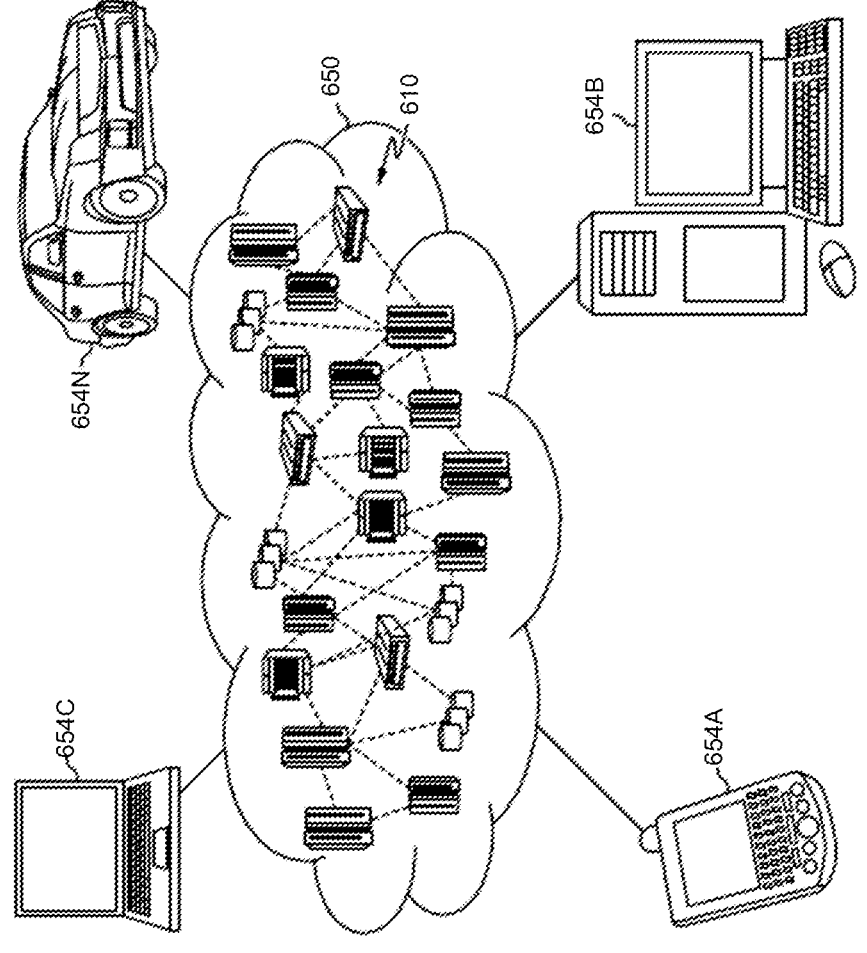
FIG. 6 depicts an illustrative cloud computing environment, consistent with an illustrative embodiment.

Referring now to FIG. 6, an illustrative cloud computing environment 600 utilizing cloud computing is depicted. As shown, cloud computing environment 600 includes cloud 650 having one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms, and/or software as services for which a cloud consumer does not need to maintain resources on a local computing device. It is understood that the types of computing devices 654A-N shown in FIG. 6 are intended to be illustrative only and that computing nodes 610 and cloud computing environment 600 can communicate with any type of computerized device over any type of network and/or network addressable connection (e.g., using a web browser).

Figure 7:
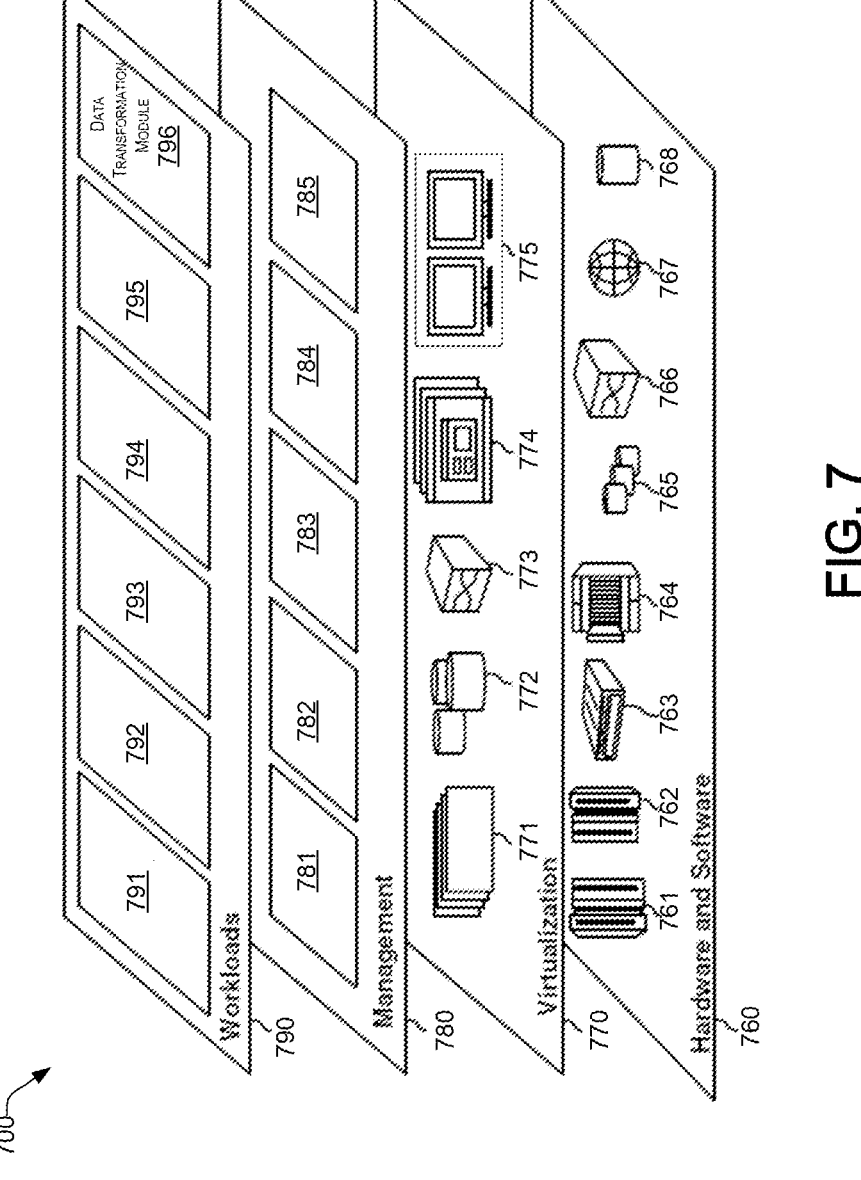
FIG. 7 depicts a set of functional abstraction layers provided by a cloud computing environment, consistent with an illustrative embodiment.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 760 include hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized.

Examples of workloads and functions which may be provided from this layer include: mapping and navigation 791; software development and lifecycle management 792; virtual classroom education delivery 793; data analytics processing 794; transaction processing 795; and a data transformation module 796 configured to provide access to end-users of data sources transformed according to dataset-specific policies and a data governance policy, as discussed herein above.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of providing data transformation, the computer-implemented method comprising:

installing, prior to processing a computational workload of an end-user on a dataset, data transformation plugins comprising data-caching, data anonymization, and node selection, in the dataset made accessible for processing the computational workload;

ingesting a dataset-specific policy for the accessible dataset and a data governance policy for the accessible dataset, wherein the data governance policy defines node selection rules for the accessible dataset;

executing the data transformation of the accessible dataset by invoking the data transformation plugins to the accessible dataset based on the dataset-specific policy to generate a transformed dataset using the data transformation plugins, wherein the transformed dataset is anonymized and stored in a local cache of a computing device, for deployment and processing;

determining, based on the data governance policy, one or more authorized computational nodes permitted for deployment of the computational workload; and deploying, by the computing device, the computational workload to the determined one or more authorized computational nodes to provide data access for processing with the transformed dataset.

2. The computer-implemented method of claim 1, wherein the executing of the data transformation of the accessible dataset and the deploying of the computational workload to provide the data access for the processing using the transformed dataset are performed on a cloud.

3. The computer-implemented method of claim 1, further comprising creating a new endpoint for the data access of the transformed dataset.

4. The computer-implemented method of claim 1, wherein the computational workload comprises a computing or a machine learning computational workload, and the provided data access using the transformed dataset is data transparent to the end-user.

5. The computer-implemented method of claim 1, wherein the execution of the data transformation by invoking the data transformation plugins includes activating a data-caching plugin installed in the accessible dataset.

6. The computer-implemented method of claim 1, wherein the invoking of the data transformation plugins comprises activating an anonymization plugin installed in the accessible dataset for the data anonymization.

7. The computer-implemented method of claim 1, further comprising applying materializing policies for applying the data transformation according to the data governance policy.

8. The computer-implemented method of claim 7, wherein the applying of the materializing policies related to the data governance policy is based on a location of the end-user.

9. A computing device, comprising:

a processor;

a storage device coupled to the processor; and an engine stored in the storage device, wherein an execution of the engine by the processor configures the computing device to:

install, prior to processing a computational workload of an end-user on a dataset, data transformation plugins comprising data-caching, data anonymization, and node selection, in the dataset made accessible for processing the computational workload;

ingest a dataset-specific policy for the accessible dataset and a data governance policy for the accessible dataset, by a policy ingestion component, wherein the data governance policy defines node selection rules for the accessible dataset;

apply the data transformation plugins to the accessible dataset based on the dataset-specific policy to generate a transformed data source that is anonymized and stored in a local cache of the storage device, for deployment and processing, by a dataset mutator;

apply, to the dataset, policies related to the data governance policy and a location of the end-user, by an orchestrator;

determine, based on the data governance policy, one or more authorized computational nodes permitted to process the transformed data source, by the orchestrator;

update user-defined computational workload definitions transparently for use with the transformed data source; and deploy the computational workload with access to the transformed data source for processing to the determined one or more authorized computational nodes, by a computational workload mutator.

10. The computing device of claim 9, wherein the dataset mutator is configured to apply a data anonymization plugin to the accessible dataset.

11. The computing device of claim 9, wherein the dataset mutator is configured to a data-caching plugin to the accessible dataset.

12. A computing device providing data transformation, the computing device comprising:

a processor; and a memory coupled to the processor, the memory storing instructions to cause the processor to perform operations comprising:

installing, prior to processing a computational workload of an end-user on a dataset, data transformation plugins comprising data-caching, data anonymization, and node selection, in the dataset made accessible for processing the computational workload;

ingesting a dataset-specific policy for the accessible dataset and a data governance policy for the accessible dataset, wherein the data governance policy defines node selection rules for the accessible dataset;

executing the data transformation of the accessible dataset by invoking the data transformation plugins to the accessible dataset based on the dataset-specific policy to generate a transformed dataset using the data transformation plugins, wherein the transformed dataset is anonymized and stored in a local cache of the computing device, for deployment and processing;

determining, based on the data governance policy, one or more authorized computational nodes permitted for deployment of the computational workload;

updating user-defined computational workload definitions transparently for use with the transformed dataset; and deploying the computational workload to the determined one or more authorized computational nodes to provide data access for processing with the transformed dataset.

13. The computing device of claim 12, wherein the the operations further comprise activating a data-caching plugin installed in the accessible dataset.

14. The computing device of claim 12, wherein the operations further comprise activating a data anonymization plugin installed in the accessible dataset.

15. The computing device of claim 12, wherein the the operations further comprise creating a new endpoint for the data access in the generating of the transformed dataset.

16. A non-transitory computer-readable storage medium tangibly embodying a computer-readable program code having computer-readable instructions that, when executed, causes a computer device to perform operations of providing data transformation, the operations comprising:

installing, prior to processing a computational workload of an end-user on a dataset, data transformation plugins comprising data-caching, data anonymization, and node selection, in the dataset made accessible for processing the computational workload;

ingesting a dataset-specific policy for the accessible dataset and a data governance policy for the accessible dataset, wherein the data governance policy defines node selection rules for the accessible dataset;

executing the data transformation of the accessible dataset by invoking the data transformation plugins to the accessible dataset based on the dataset-specific policy to generate a transformed dataset using the data transformation plugins, wherein the transformed dataset is anonymized and stored in a local cache of a computing device, for deployment and processing;

determining, based on the data governance policy, one or more authorized computational nodes permitted for deployment of the computational workload; and deploying the computational workload to the determined one or more authorized computational nodes to provide data access for processing with the transformed dataset.

17. A computer-implemented method for performing data transformation in a Kubernetes framework for a cloud-based application, the computer-implemented method comprising:

installing, by a computing device, prior to processing a computational workload on a dataset, data transformation plugins comprising data-caching, data anonymization, and node selection, in the dataset made accessible for processing the computational workload;

receiving, by the computing device, the accessible dataset including a masked ID field and a restriction to one or more authorized computational nodes for processing;

ingesting, by the computing device, a dataset-specific policy for the accessible dataset and a data governance policy for the accessible dataset, wherein the data governance policy defines node selection rules for the accessible dataset;

matching, by the computing device, the ingested dataset-specific policy and the data governance policy with available data transformations for the dataset;

executing, by the computing device, the data transformation of the accessible dataset by invoking the data transformation plugins to the accessible dataset based on the dataset-specific policy to generate a transformed dataset that is anonymized and stored in a local cache of the computing device, for deployment and processing, wherein the invoked data transformation plugins correspond to the available data transformations;

determining, by the computing device, based on the data governance policy, the one or more authorized computational nodes permitted for deployment of the computational workload; and deploying, by the computing device, the computational workload to the determined one or more authorized computational nodes to provide data access for processing with the transformed dataset.

18. The computer-implemented method of claim 17, further comprising creating a new endpoint for the data access in the generating of the transformed dataset.

19. The computer-implemented method of claim 17, further comprising caching the transformed dataset, transparently, in the determined one or more authorized computational nodes according to the data governance policy.

* * * * *